May 8, 1956  D. H. KEISER, JR  2,744,321
SHEARING ACTION DEVICE
Filed Jan. 13, 1956  3 Sheets-Sheet 3
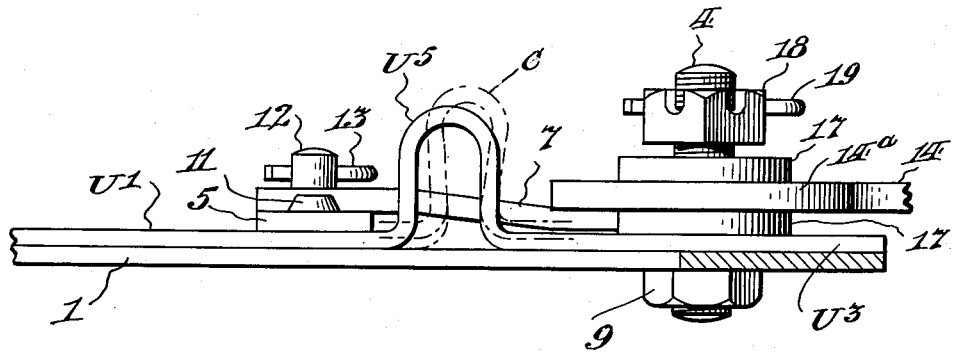
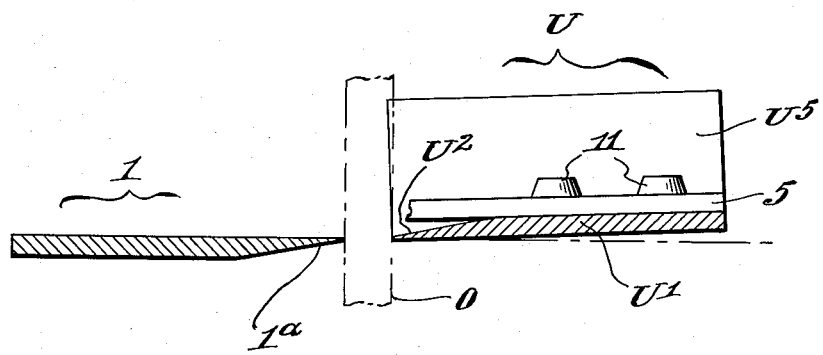
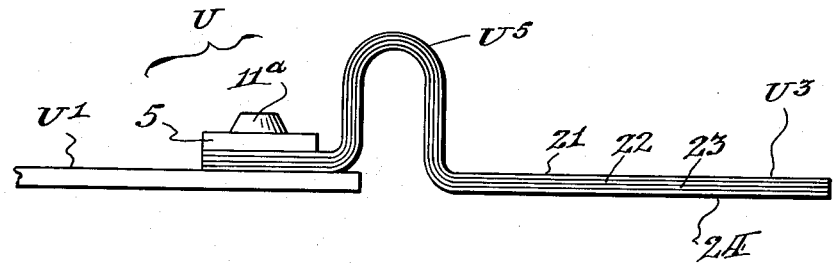
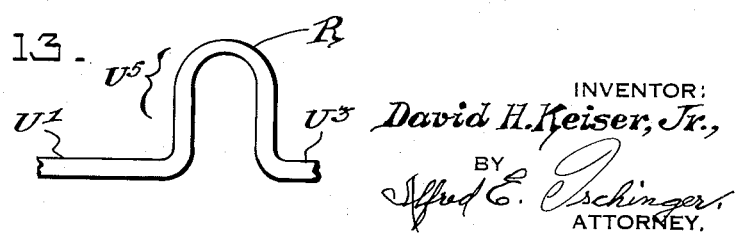
INVENTOR:
David H. Keiser, Jr.,
BY Alfred E. Ischinger
ATTORNEY.

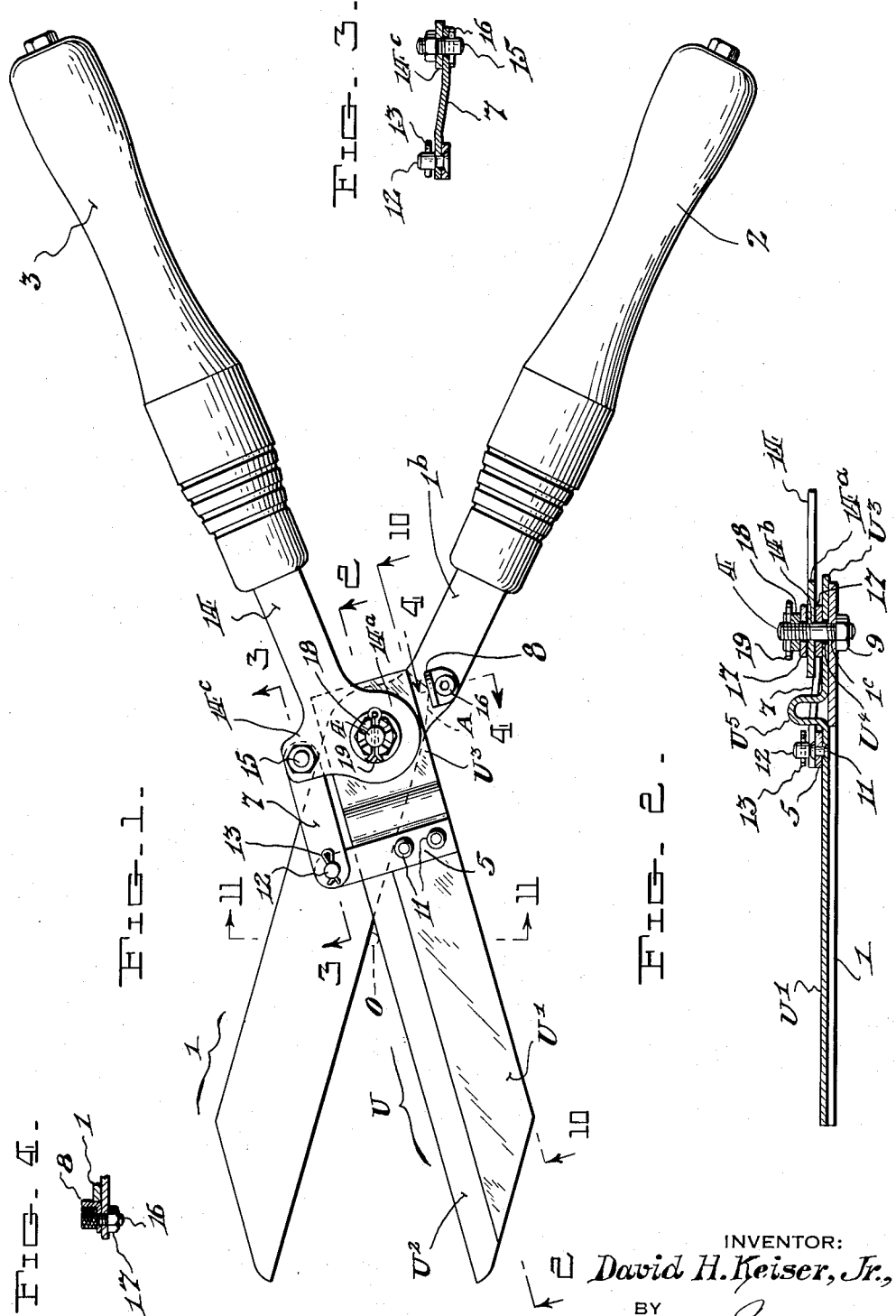

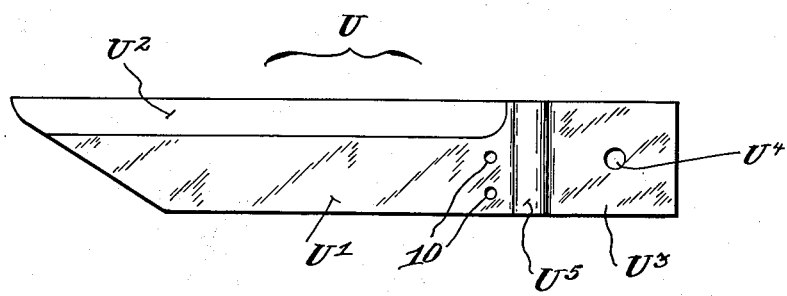
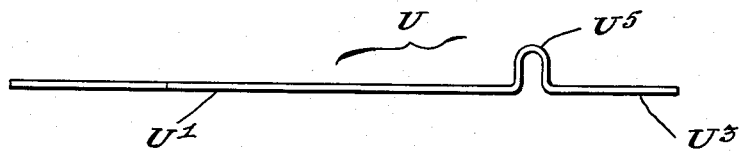
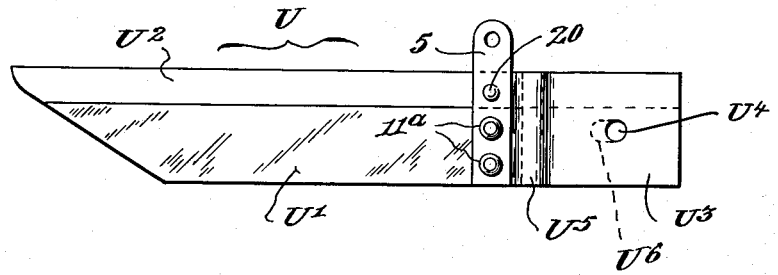
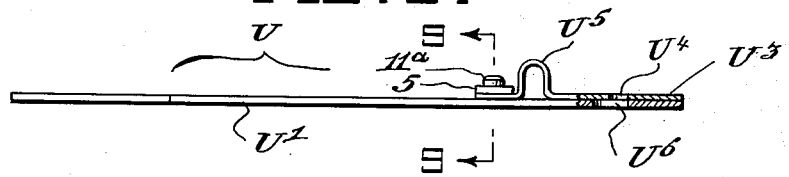
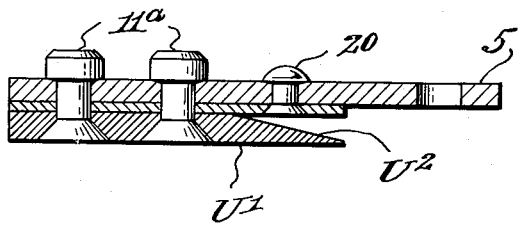

United States Patent Office 2,744,321
Patented May 8, 1956

2,744,321

SHEARING ACTION DEVICE

David Howard Keiser, Jr., West Lawn, Pa.

Application January 13, 1956, Serial No. 559,006

16 Claims. (Cl. 30—237)

This invention relates, in general, to shearing devices which comprise a pair of cutting blades that are cooperatively actuated relative to each other to effect cutting operation of the device; and more particularly concerns a shearing device of this type which is constructed to effect positive canting and axial movement of one of the cutting blades thereof relative to the other and the exertion of a certain contact or clamping pressure between the cutting edges of the blades, during the cutting operation of the device.

For purposes of exemplification, or illustration, my invention is herein disclosed in the form of a practical hedge trimming shear device. From this disclosure, it will be readily apparent to those skilled in this art how my invention can be embodied, or applied, in the same or in similar manner, to other types of shearing devices.

One object of my invention is to provide a novel shearing device of the type indicated.

Another object is to provide such a device which has certain structural and functional features of advantage over the similar devices of the prior art.

Another object is to provide such a device which performs its cutting operation more effectively and efficiently than the similar prior art devices.

A further object is to provide such a device having novel means for effecting positive canting and axial movement of one of the blades thereof relative to the other, during the cutting operation of the device.

An additional object is to provide such a device having a novel cutting blade unit and unique operating means therefor.

Another object is to provide a novel cutting blade unit for a shearing device of the type indicated, which unit comprises a forward cutting edge including portion, a rearward portion provided with a pivot aperture, an integral transversely extending resilient spring forming portion arranged in interposed relation between said forward and rearward portions, and means on said forward portion for establishing an actuating connection with said unit so as to permit positive operation of the latter in a certain manner.

It is also an object to provide a novel cutting blade unit of the type indicated in which the said resilient spring forming portion has an arched configuration that is of lesser thickness than the adjacent portions of the unit.

Another object is to provide a novel cutting blade unit of the type indicated which comprises a forward cutting edge including member, a separate rearward member which is provided with a pivot aperture and has an integral transversely extending resilient spring forming portion arranged adjacent to its forward end, in conjunction with means for fixedly securing said forward end of the rearward member to the forward cutting edge including member.

Another feature resides in the provision of hand operated shears comprising in combination with an integrally combined cutting blade and handle member, of a cooperating cutting blade unit having a loose pivotal connection with said member so as to permit movement of the unit in tilted parallel planular relation with the cutting blade of said member, spring means arranged in interposed relation between the cutting edge including portion of the unit and its pivotal connection with said member, a unit operating handle movably mounted in reciprocable relation with the handle of said member, and connecting means arranged between said unit and unit operating handle in such manner as to effect positive tilting and axial movement of said cutting edge including portion of the unit, relative to the cutting blade of said member, during the cutting operation of the shears.

With these and other objects in view, which will become more readily apparent from the following detailed description of the various unique, practical and illustrative shear improvements shown in the accompanying drawings, my invention comprises the novel shears, cutting blade units, elements, features of construction and arrangement of parts in cooperative relationship, as more particularly indicated and defined by the hereto appended claims.

In the accompanying drawings:

Figure 1 is a top plan view of one form of shears embodying my invention.

Fig. 2 is an elevational sectional view, taken substantially as indicated by the arrows 2—2 on Fig. 1.

Fig. 3 is an elevational sectional view, taken substantially as indicated by the arrows 3—3 on Fig. 1.

Fig. 4 is a detail elevational sectional view, taken substantially as indicated by the arrows 4—4 on Fig. 1.

Fig. 5 is a top plan view of one form of novel cutting blade unit in accordance with my invention.

Fig. 6 is a side elevational view of the cutting blade unit shown in Fig. 5.

Fig. 7 is a top plan view of a modified form of cutting blade unit in accordance with my invention.

Fig. 8 is a side elevational view of the cutting blade unit shown in Fig. 7.

Fig. 9 is a transverse elevational sectional view, taken substantially as indicated by the arrows 9—9 on Fig. 8.

Fig. 10 is an enlarged elevational sectional view, taken substantially as indicated by the arrows 10—10 on Fig. 1.

Fig. 11 is an enlarged transverse elevational sectional view, taken substantially as indicated by the arrows 11—11 on Fig. 1.

Fig. 12 is a partial side elevational view, on an enlarged scale, of another modified form of the cutting blade unit of my invention, and Fig. 13 is a partial side elevational view, on an enlarged scale, of a modification of the resilient spring forming portion of the cutting blade unit of my invention.

Referring first more particularly to Figs. 1 to 6 inclusive of the drawings, the shearing action device of my invention illustrated by these figures generally comprises the hedge shears of Fig. 1, having a lower cutting blade member 1 that has integrally combined therewith a handle 2, a cutting blade unit that is generally indicated by the letter U, a separate handle 3 for operating the unit U, a pivot element 4 that is fixed to, and extends upwardly from, the lower cutting blade 1, a lever arm 5 that is fixedly secured to the cutting blade unit U, a connecting link 7 and an abutment element 8.

The lower cutting blade 1 and the cutting blade unit U (see Figs. 5 and 6) can advantageously be produced from sheet steel that is cut by stamping dies to provide each of these parts with a marginal shape as shown. The lower cutting blade 1 and the unit U may also be produced by drop forging, as is usual for small steel articles that are to be manufactured in quantity and of an exact shape, or the blade 1 and unit U may be otherwise produced in accordance with the modern practices and procedures prevailing in this art.

The lower cutting blade has the general configuration shown in Fig. 1, and is provided with a usual type beveled cutting edge portion $1^a$, an integral rearward extension $1^b$ adapted to be fixedly anchored in any usual and well known manner in the handle 2, and the latter may be formed of wood or some other material suitable for this purpose.

By referring to Fig. 2, it will be noted that the pivot element 4 comprises a cylindrical stud that is provided with screw threads at its upper and lower ends. The cutting blade 1 is provided with a screw threaded aperture $1^c$, in which the lower end of the pivot element 4 is threadedly engaged and fixedly anchored by a lock nut 9 that is tightly turned against the lower surface of the cutting blade 1 and then fixed in position in any usual and well known manner. The pivot element 4 may also be fixed to the cutting blade 1, at the location shown, in some other usual and practical manner.

The cutting blade unit U of my invention generally comprises a forward portion $U^1$ that includes a usual beveled cutting edge $U^2$, a rearward portion $U^3$ that is provided with a pivot aperture $U^4$, and an integral resilient spring forming portion $U^5$ of arched configuration that is arranged in interposed relation between the forward cutting edge including portion $U^1$ and the rearward portion $U^3$. Two similar apertures 10 are provided in the forward portion $U^1$, adjacent to the portion $U^5$, and the lever arm 5 is secured to the upper surface of the portion $U^1$ by two rivets 11 which extend through appropriate apertures in the lever arm 5 and the apertures 10 in the portion $U^1$ of the unit U. The lever arm 5 is formed of flat sheet steel or may be formed of some other flat metallic sheet material suitable for this purpose. At its outer end, the lever arm 5 is provided with an aperture in which is fixedly secured an upwardly extending pivot stud 12, having loosely connected therewith the forward apertured end of the connecting link 7. A cotter pin 13 extends through a transverse aperture in the pivot stud 12, above the connecting link 7, and serves to retain the latter in position on the pivot stud 12.

The handle 3 is similar in shape and construction to the handle 2 and has anchored therein, in any usual and well known practical manner, a flat sheet metal extension member or plate 14 that is generally shaped as shown in Fig. 1, so as to include a substantially circular portion $14^a$ that is provided with a central pivot aperture $14^b$, and a laterally offset portion $14^c$ to which is fixedly secured a depending pivot stud 15. The rearward end of the connecting link 7 is pivotally mounted on the stud 15 and is retained thereon by a cotter pin 16 that extends through a transverse aperture in the stud 15. The lower end of the pivot stud 15 extends below the upper surface of the cutting blade 1, so that said stud 15 also functions as a stopping element that is adapted to abut against the rear edge of the cutting blade 1, when the handles 2 and 3 are moved apart to effect maximum opening of the cutting edges of the shears.

The abutment element 8 is formed of sheet metal, is of right angular configuration as shown and is secured to the top surface of the cutting blade 1 by a bolt 16 the lower threaded portion of which extends through a suitable aperture in the cutting blade member 1 and is fixed to the latter by a lock nut 17, in the position shown, so that a rear corner of the unit U will abut against the element 8 when the cutting blades of the shears are in their closed relation, as indicated in Fig. 4 and by the dotted line A in Fig. 1.

The circular portion $14^a$ of the extension member 14, is pivotally mounted on the fixed pivot element 4, between two similar metallic spacing washers 17, and the upper threaded end of the pivot element 4 has mounted thereon a crown nut 18 that is held in fixed adjusted position by a cotter pin 19 that extends through a suitable transverse aperture provided in the upper end of the pivot element 4.

The apertures of the spacing washers 17 and the pivot aperture $U^4$ of the unit U, are of somewhat larger diameter than the diameter of the pivot element 4, and the parts on the pivot element 4, between the top surface of the cutting blade member 1 and the bottom surface of the crown nut 18, are loosely or spacedly arranged between said surfaces in such manner that the unit U can be transversely canted, or tilted, and moved about the pivot element 4 in parallel planular relation with the cutting blade member 1, for a purpose hereinafter more fully explained.

The portion $U^5$ of the unit U is arched, or looped, in configuration so as to provide an integral transversely extending resilient or spring-like formation between the forward cutting edge including portion $U^1$ and the rearward portion $U^3$ of the cutting blade unit U, which springlike formation functions to permit axial movement, or reciprocation, of the cutting edge including portion $U^1$ in conjunction with the contraction and expansion of the springlike formation. Contraction of the spring-like formation $U^5$ is effected by the rearwardly pulling force exerted on the lever arm 5 by the handle 3, during the cutting action of the shears, when an object is in cutting position between the cutting edges $1^a$ and $U^2$, as indicated by the dotted lines O in Figs. 1 and 11, and the handles 2 and 3 are moved toward each other. Simultaneously with the contraction of the resilient portion $U^5$, as indicated by the dot-and-dash lines C on Fig. 10, and rearward axial movement of the cutting edge including portion $U^1$ of the unit U, the latter will also be canted, or tilted, as clearly indicated in Fig. 11, so that the cutting edge including portion $U^1$ is both tilted and axially moved during each cutting operation of the shears. By this simultaneous canting of the unit U and rearward axial movement of its cutting edge including portion $U^1$, the cutting edges of the blade 1 and the portion $U^1$ will automatically exert a tightening contact pressure on each other and on the object O therebetween, in conjunction with the axial cutting movement of the cutting edge $U^2$ of the portion $U^1$. In this manner, maximum cutting effectiveness and efficiency is attained in connection with the shearing action of the device.

The canting or tilting of the unit U, during the cutting operation of the shears, results because the pivot point at the rear end of the connecting link 7 is lower than the pivot point at the front thereof, so that the pulling action exerted on the outer free end of the lever arm 5, when the handle 3 is moved toward the handle 2, is in a downward direction.

After the performance of a cutting operation by the shears, and upon release of the cutting pressure on the handles 2 and 3, the spring-like resilient portion $U^5$ of the unit U will immediately expand to its former normal condition, or configuration, and thereby axially move the cutting edge including portion $U^1$ of the unit U back to its initial position.

Figs. 7 to 9 inclusive disclose a modified form of the cutting blade unit U of my invention. Since this modified form differs from the previously described cutting blade unit U only in that this modified form is made in two separate pieces that include all the various portions of the unit U already described and these separate pieces are fixedly united with each other by two similar rivets $11^a$, the same reference characters have been applied in Figs. 7 to 11 inclusive, to designate the corresponding parts of the unit U already described, thereby to avoid redundancy of descriptive matter. It is to be noted, however, that since the separate rearward piece which includes the portion $U^3$ and the transversely extending resilient spring-like portion $U^5$ of the modified unit U shown in Figs. 7 to 9 inclusive, is separately produced it may be made of sheet metal such as steel, spring brass, or some other suitable metal. It can also be made of a lighter gauge metal, if desired, in order to effect easier flexibility, or less stiffness, in the spring action of the looped, or arched portion $U^5$.

If desired, an additional reinforcing rivet 20 may also be applied as shown in Fig. 9, so as to effect a stronger joint between the lever arm 5 and the separately formed part, or piece, that includes the portion $U^3$ and the arched portion $U^5$.

As shown in Figs. 7 and 8, the cutting edge including portion $U^1$ may be extended below the portions $U^5$ and $U^3$ and at its rearward end the portion $U^1$ may be provided with an elongated aperture $U^6$ to permit longitudinal movement of the portion $U^1$ relative to the fixed pivot stud 4 that is arranged to extend through the apertures $U^4$ and $U^6$ in the manner of the assembled parts shown in Fig. 2.

Another modified form of the cutting blade unit U of my invention is disclosed in Fig. 12. In this instance the same reference characters have also been utilized to designate corresponding parts previously described, since the unit U of Fig. 12 is also made in two separate parts which are fixedly united by riveting, in the same manner as the unit U shown in Figs. 7 to 9 inclusive. However, the separate rearward part of the unit U of Fig. 12 which includes such portions already described as the portions $U^3$ and $U^5$, is formed of a plurality of individual thin metal elements 21, 22, 23 and 24 which may be produced from sheet metal, such as steel, spring brass, etc., and are arranged and combined with each other in superimposed relation. By combining such thin metal elements as shown, to form the rearward part of the unit U of Fig. 12, the looped or arched portion $U^5$ has imparted thereto the resiliency and flexibility characteristic of a multiple spring-like arrangement so formed.

Referring again to the cutting blade unit U, as shown by itself in Figs. 5 and 6, if it is desired to effect easier flexibility or less stiffness, of the integrally formed looped, or arched, spring-like portion $U^5$ thereof, this may be readily accomplished by reducing the thickness of said looped, or arched portion in any desired practical manner, as clearly indicated at R in Fig. 13, which latter shows a fragmentary part of the cutting blade unit U, so modified.

Of course, the shearing action device improvements specifically shown and described, can be changed and modified in various ways, without departing from the invention herein disclosed and more particularly defined by the hereto appended claims.

I claim:

1. Shears comprising in combination with an integrally combined cutting blade and handle member, of a cooperating cutting blade unit having a loose pivotal connection with said member, spring means arranged in interposed relation between a cutting edge including portion of the unit and its pivotal connection with said member, a unit operating handle movably mounted in reciprocable relation with the handle of said member, and connecting means arranged between said unit and unit operating handle in such manner as to effect positive tilting and axial movement of said cutting edge including portions of the unit during the cutting operation of the shears.

2. Shears in accordance with claim 1, wherein the spring means comprises an integral resilient part of said unit.

3. Shears in accordance with claim 1, wherein said spring means comprises an integral resilient part of said unit which part has an arched configuration.

4. Shears in accordance with claim 1, wherein said spring means comprises an integral transversely extending resilient part of said unit which part has an arched configuration of lesser thickness than the adjacent parts of the unit.

5. Shears in accordance with claim 1, wherein said spring means comprises a separately formed element that is fixedly secured to said cutting edge including portion of the unit.

6. Shears in accordance with claim 1, wherein said spring means comprises a separately formed element that is fixedly secured to said cutting edge including portion of the unit and is provided with a transversely extending resilient part of arched configuration.

7. Shears in accordance with claim 1, wherein said spring means comprises a plurality of individual elements that are combined with each other in superimposed relation and collectively secured to the cutting edge including portion of the unit.

8. Shears in accordance with claim 1, wherein said spring means comprises a plurality of similar individual elements that are combined with each other in superimposed relation and collectively secured to the cutting edge including portion of the unit, each of which elements is provided with a transversely extending resilient part of arched configuration.

9. Shears comprising an integrally combined cutting blade and handle member, a fixed pivot element arranged in intermediate relation on said member and projecting upwardly therefrom, a cooperating cutting blade unit mounted on said member in loosely connected relation with said pivot element so as to be movable in tilted parallel planular relation with the cutting blade of said member, resilient means forming part of said unit and arranged in interposed relation between a cutting edge including portion thereof and said pivot element, a unit operating handle movably mounted in reciprocable relation with the handle of said member, and connecting means arranged between said unit and operating handle in such manner as to effect positive tilting and axial movement of the cutting edge including portion of the unit during cutting operation of the shears.

10. A cutting blade unit of the character described, comprising a forward cutting edge including portion, a rearward portion provided with a pivot aperture, an integral transversely extending resilient portion arranged in interposed relation between said forward and rearward portions of the unit, and means on said forward portion for establishing an actuating connection with said unit.

11. A cutting blade unit of the character described, comprising a forward cutting edge including portion, a rearward portion provided with a pivot aperture, an integral transversely extending resilient portion of arched configuration arranged in interposed relation between said forward and rearward portions of the unit, and means on said forward portion for establishing an actuating connection with said unit.

12. A cutting blade unit of the character described, comprising a forward cutting edge including portion, a rearward portion provided with a pivot aperture, and an integral transversely extending resilient portion of arched configuration arranged in interposed relation between said forward and rearward portions of the unit, which arched portion is of lesser thickness than the adjacent portions of the unit.

13. A cutting blade unit of the character described, comprising a forward cutting edge including member, a separate rearward member which is provided with a pivot aperture and has an integral transversely extending resilient portion arranged adjacent to its forward end, and means fixedly securing said forward end of the rearward member to the forward cutting edge including member.

14. A cutting blade unit of the character described, comprising a forward cutting edge including member, a separate rearward member which is provided with a pivot aperture and is composed of a plurality of similar elements that are combined with each other in superimposed relation, a transversely extending resilient portion formed on each of said elements which resilient portions are vertically aligned with each other, and means fixedly securing said forward and rearward members to each other.

15. A cutting blade unit of the character described, comprising a forward cutting edge including member, a separate rearward member which is provided with a pivot aperture and is composed of a plurality of similar elements that are combined with each other in superimposed relation, a transversely extending arched portion formed on each of said elements which arched portions are vertically aligned with each other, and means fixedly securing said forward and rearward members to each other.

16. A cutting blade unit of the character described, comprising a cutting edge including member, a separate member which is provided with a pivot aperture and has an integral transversely extending resilient spring-like portion, and means fixedly connecting said members in superimposed relation with each other.

No references cited.